US007287339B2

(12) United States Patent
Robertson

(10) Patent No.: US 7,287,339 B2
(45) Date of Patent: Oct. 30, 2007

(54) TEMPLATE FOR RULING INDEX CARDS

(76) Inventor: Gregory L. Robertson, 7817 E. Barrett Rd., Fort Washington, MD (US) 20744

( * ) Notice: Subject to any disclaimer, the term of this patent is extended or adjusted under 35 U.S.C. 154(b) by 0 days.

(21) Appl. No.: 11/582,424

(22) Filed: Oct. 18, 2006

(65) Prior Publication Data

US 2007/0033821 A1 Feb. 15, 2007

Related U.S. Application Data

(63) Continuation-in-part of application No. 10/980,243, filed on Nov. 4, 2004, now abandoned.

(60) Provisional application No. 60/530,257, filed on Dec. 18, 2003.

(51) Int. Cl.
*G01B 3/14* (2006.01)

(52) U.S. Cl. ............................ 33/562; 33/566; 33/19.2

(58) Field of Classification Search .......... 33/562-563, 33/566, 19.2, 425, 575
See application file for complete search history.

(56) References Cited

U.S. PATENT DOCUMENTS

| | | | |
|---|---|---|---|
| 573,973 | A | 12/1896 | Harris |
| 1,350,993 | A | 8/1920 | Evans |
| 1,472,057 | A | 10/1923 | Ellis |
| 1,820,090 | A | 8/1931 | Polkosnik |
| 1,870,145 | A | 8/1932 | Sharp |
| 2,101,949 | A | 12/1937 | Luckie |
| 2,398,668 | A | 4/1946 | Wartha |
| 2,585,847 | A | 2/1952 | Roshkind |
| 2,620,568 | A | 12/1952 | Otis |
| 2,623,324 | A | 12/1952 | La Barber |
| 2,653,387 | A | 9/1953 | Arthur |
| 2,887,791 | A | 5/1959 | Garbutt |

(Continued)

FOREIGN PATENT DOCUMENTS

DE 31 06 176 A1 9/1982

(Continued)

OTHER PUBLICATIONS http://www.croppinparadise.com/templates-stencils-coluzzle-templates-c-56_170.html "Coluzzle Templates" retrieved on Jun. 21, 2006.

(Continued)

*Primary Examiner*—Yaritza Guadalupe-McCall
(74) *Attorney, Agent, or Firm*—Richard C. Litman

(57) ABSTRACT

The template for ruling index cards is a guide for marking a number of parallel lines on an unruled writing surface, such as a 3"x5" index card. The template has a number of parallel slits spaced at predesignated distances from each other. Preferably, a template with horizontal slits is used in combination with a template having vertical slits to form a grid with horizontal and vertical rules for blocking letters, i.e., for creating blocks, which ensure uniform size and spacing of letters drawn on the index card. The template may be used to form a grid on a marking substrate, which is used as a guide for marking sweepstakes entries on the substrate. A transparency may be laid over the substrate, and cutouts formed corresponding to the entries to form a template for sweepstakes entries from the transparency.

14 Claims, 15 Drawing Sheets

U.S. PATENT DOCUMENTS

| | | | |
|---|---|---|---|
| 3,090,533 | A | 5/1963 | Claeys |
| 3,197,878 | A | 8/1965 | Rieseback |
| 3,371,420 | A | 3/1968 | Pane, Jr. |
| 3,376,650 | A | 4/1968 | Cook |
| 3,435,531 | A | 4/1969 | Morris |
| 3,623,250 | A | 11/1971 | Misenko |
| 3,633,286 | A | 1/1972 | Maurer |
| 3,721,011 | A | 3/1973 | Anderka |
| 3,731,402 | A | 5/1973 | Paul |
| 3,798,781 | A | 3/1974 | Wolfe |
| 3,823,963 | A | 7/1974 | Fitzgerald et al. |
| 3,893,243 | A | 7/1975 | Schuller |
| 3,939,588 | A | 2/1976 | Hockaday |
| 4,185,392 | A | 1/1980 | Berkman |
| 4,230,164 | A | 10/1980 | Mericle |
| 4,275,502 | A | 6/1981 | Jones |
| 4,336,754 | A | 6/1982 | Loeb |
| 4,470,197 | A | 9/1984 | Pagalies |
| 4,505,041 | A | 3/1985 | Keeney |
| 4,586,906 | A | 5/1986 | Buccieri, Jr. |
| 4,604,062 | A | 8/1986 | Woods |
| 4,651,434 | A | 3/1987 | Haynes |
| 4,688,330 | A | 8/1987 | Konrad |
| 4,741,107 | A | 5/1988 | Circle |
| 4,799,317 | A | 1/1989 | Christian et al. |
| 4,852,268 | A | 8/1989 | Sutherland et al. |
| 4,928,399 | A | 5/1990 | Kragt |
| 4,986,005 | A | 1/1991 | Grippi et al. |
| 5,027,523 | A | 7/1991 | MacLeod |
| 5,052,118 | A | 10/1991 | Beitler |
| 5,058,285 | A | 10/1991 | Morita |
| 5,100,324 | A | 3/1992 | Slayton |
| 5,154,422 | A | 10/1992 | Highsmith, Sr. et al. |
| 5,337,663 | A | 8/1994 | McKillip |
| 5,347,724 | A | 9/1994 | Hankins |
| 5,384,964 | A | 1/1995 | McKay |
| 5,511,316 | A | 4/1996 | Fischer et al. |
| 5,557,996 | A | 9/1996 | Reber et al. |
| 5,570,533 | A | 11/1996 | Vouyouka |
| 5,577,328 | A | 11/1996 | Kerry, Sr. |
| 5,626,551 | A | 5/1997 | Kearns et al. |
| 5,694,855 | A | 12/1997 | Gardner |
| 5,698,297 | A | 12/1997 | Pitts et al. |
| 5,791,062 | A | 8/1998 | Walker |
| D398,864 | S | 9/1998 | Dietterich et al. |
| 6,112,425 | A | 9/2000 | Nelson et al. |
| 6,142,071 | A | 11/2000 | Fexer |
| 6,142,783 | A | 11/2000 | Rocha |
| 6,216,354 | B1 | 4/2001 | Carbone |
| 6,237,240 | B1 | 5/2001 | Nelson et al. |
| 6,324,767 | B1 | 12/2001 | Houston |
| 6,351,893 | B1 | 3/2002 | St. Pierre |
| 6,357,130 | B1 | 3/2002 | Rank |
| 6,539,636 | B1 | 4/2003 | Jennings |
| 7,086,172 | B2 * | 8/2006 | Åstrom ........................ 33/563 |
| 2001/0032394 | A1 | 10/2001 | Cross et al. |
| 2002/0165076 | A1 | 11/2002 | Marchant |
| 2003/0093910 | A1 | 5/2003 | Chang |
| 2005/0132592 | A1 | 6/2005 | Robertson |
| 2006/0096110 | A1 * | 5/2006 | Clack .......................... 33/566 |
| 2007/0011900 | A1 * | 1/2007 | Mastroianni ................. 33/566 |

FOREIGN PATENT DOCUMENTS

| | | |
|---|---|---|
| DE | 3232420 | 3/1984 |
| DE | 4111412 | 10/1992 |
| DE | 198 33 999 C1 | 7/2000 |
| GB | 2 088 288 A | 6/1982 |
| GB | 2196305 | 4/1988 |
| JP | 6-328874 | 11/1994 |

OTHER PUBLICATIONS http://www.archivalusa.com/ktmp.html "Pioneer Tracing Templates" retrieved on Jun. 21, 2006.

*Technical Drawing*, Giesecke et al., published in 1974 by Macmillian Publishing Co., Inc., at 70-77.

* cited by examiner

TEMPLATE FOR RULING INDEX CARDS

CROSS-REFERENCE TO RELATED APPLICATIONS

This application is a continuation-in-part application claiming the benefit of U.S. patent application Ser. No. 10/980,243, filed Nov. 4, 2004 now abandoned, which is incorporated by reference in its entirety herein and which claims the benefit of U.S. Provisional Patent Application Ser. No. 60/530,257, filed Dec. 18, 2003.

BACKGROUND OF THE INVENTION

1. Field of the Invention

The present invention relates to a drawing tool, and more particularly to a template for ruling index cards by marking lines at set or ruled distances on a 3"×5" index card.

2. Description of the Related Art

Those who have ever tried to write down information on an unlined surface know the problems of trying to keep written information neat. For example, when writing one's name and address on an unruled postcard, the text can start off being written in straight lines and then suddenly become slanted or crooked.

Information written in crooked lines, or which is just messy, can cause a reader trouble when reading the postcard, and will probably cause delay in mailing items if the post office is unable to decipher the mailing address. A number of items have been developed that guide a writing instrument or a cutting instrument in making marks, letters and/or cuts, respectively, on a surface.

Although some manufacturers make index cards with pre-printed, ruled lines, the lines are standardized. A template or templates for creating a customized ruled index card, including a ruled grid, in order to aid in preparing a neatly printed 3"×5" index card would be desirable.

U.S. Pat. No. 3,939,588, issued to Hockaday on Feb. 24, 1976, describes a lettering guide apparatus having a number of releasable adhesive-mounted parallel strips that can be peeled off to expose a writing surface. The strips that remain intact provide guides for writing information in straight lines. U.S. Pat. No. 5,052,118, issued to Beitler on Oct. 1, 1991, describes a template for laying out cut lines in mats used for framing pictures, prints, stamps, etc. The template has a number of holes to insert a pen or pencil to make hole marks on a drawing surface. The holes are then connected to form straight lines.

U.S. Pat. No. 4,928,399, issued to Kragt on May 29, 1990, describes a marking template. The template is made from cardboard and has slots and holes for positioning a pen or pencil to make holes and compound angle marks for cutting and drilling into material. U.S. Pat. No. 6,324,767, issued to Houston on Dec. 4, 2001, describes a leveling card that can also be used as a template for tracing or drawing straight lines.

Templates that assist the user in drawing letters are described in U.S. Pat. No. 3,721,011, issued to Anderka on Mar. 20, 1973 (a transparent template having a number of openings shaped into letters for drawing letters), and in U.S. Pat. No. 4,185,392, issued to Berkman on Jan. 29, 1980 (a drawing template for drawing large letters having a plurality of linear and non-linear slots).

Drawing templates are disclosed in U.S. Pat. No. 4,688,330, issued to Konrad on Aug. 25, 1987 (a template for drawing ellipses that uses holders to permit the user to move the template around without having to use pins to hold the template in place); U.S. Pat. No. 6,237,240 issued to Nelson et al. on May 29, 2001 (a template for stenciling borders and corners having four edges each having its own design pattern to trace or cut a design); and U.S. Pat. No. 6,351,893, issued to St. Pierre on Mar. 5, 2002 (a plastic drawing template having openings that relate to traffic symbols for diagramming traffic intersections and accident scenes).

Templates used to draw figures, lines or circles are described in U.S. Pat. No. 3,633,286, issued to Maurer on Jan. 11, 1972 (transparent flat stencil having openings or imprints or molded outlines of toy figures on its surface to outline the figure); U.S. Pat. No. 5,058,285, issued to Morita et al. on Oct. 22, 1991 (a template for drawing a number of concentric figures in exact alignment with each other); U.S. Pat. No. 4,275,502, issued to Jones on Jun. 30, 1981 (a drafting device for drawing concentric lines); U.S. Pat. No. 5,384,964, issued to McKay on Jan. 31, 1995 (a rotating circle template used to draw various sizes of circles); German Patent Number 3,106,176 published on Sep. 9, 1982 (ruler for drawing lines and/or measuring, cutting and laying templates); and German Patent Number 19,833,999 published on Jul. 3, 2000 (drawing and measuring template).

Several templates have been developed for drawing perspective lines and figures that are described in U.S. Pat. No. 4,505,041, issued to Keeney on Mar. 19, 1985 (a drafting template having non-concentric elliptical patterns permits perspective drawing to show scale and proportions in designing rooms, buildings, etc.); U.S. Pat. No. 6,357,130 issued to Rank on Mar. 19, 2002 (a drafting template for drawing axonometric drawings); British Patent Number 2,088,288 published on Jun. 9, 1982 (a perspective drawing template having parts that slide along circular guide surfaces and reference lines to draw lines); and U.S. Pat. No. 5,347,724, issued to Hankins on Sep. 20, 1994 (a transparent and inscribed cropping template having apertures that align with each other to easily crop material).

Templates used for making or cutting articles are described in U.S. Patent Publication No. 2002/01655076, published on Nov. 7, 2002 (a thin transparent template for making an envelope blank that can be sized specifically to enclose an item); U.S. Pat. No. 5,626,551, issued to Kearns et al. on May 6, 1997 (a greeting card manufacturing kit having templates to assist one in making cards or envelopes); and U.S. Patent Publication number 2001/0032394, published on Oct. 25, 2001 to Cross et al. (an estimating device used to measure the amount of material needed from a roll of floor covering to cover an area of a room).

Still other templates used in making garments or quilts are described in U.S. Pat. No. 3,798,781, issued to Wolfe on Mar. 26, 1974 (a template for making back trouser pockets); U.S. Pat. No. 5,570,533 issued to Vouyouka on Nov. 5, 1996 (a pattern-grading template for grading of every part of a garment used in the mass production of garments); U.S. Pat. No. 6,539,636, issued to Jennings on Apr. 1, 2003 (a circular and transparent garment pattern-sizing template having a center point and a number of grids for marking a pattern piece underneath); U.S. Pat. No. 5,791,062, issued to Walker on Aug. 11, 1998 (a flat transparent quilting template having straight and arcuate edge portions for guiding a cutting tool and being marked with straight guide lines to assist in aligning the template with fabric).

*Technical Drawing*, Giesecke et al., published in 1974 by Macmillan Publishing Co, Inc., at pp. 70-77, describes the process of drawing guide lines for ensuring uniform vertical and horizontal spacing of letters, as well as uniform letter size. Giesecke et al. describe the use of a Braddock-Rowe Lettering Triangle (a triangle having columns of grouped holes at predetermined distances from the hypotenuse for desired letter size) and an Ames Lettering Guide (device with a rotatable circle mounted on a frame having an orthogonal edge and a slanted edge, the circle having indexed columns of holes for drawing guide lines of predetermined spacing) for drawing grid lines which provide uniform blocks defining letter size and spacing. Both of these devices must be moved along a T-square or other straight edge when drawing the guidelines.

There have been other attempts to provide a template for various purposes, e.g., German Patent Number 3,232 420, published Mar. 1, 1984, that discloses a template for lottery tickets; German Patent Number 4,111,412, published Oct. 15, 1992, also disclosing a template for lottery tickets; and Japanese Patent Number 6-328,874, published Nov. 29, 1994, which discloses the use of two stencil papers for application of images to postcards.

None of the above inventions and patents, taken either singly or in combination, is seen to describe the instant invention as claimed. Thus, a template for ruling index cards solving the aforementioned problems is desired.

SUMMARY OF THE INVENTION

The template for ruling index cards provides a guide for marking a number of parallel lines on an unruled writing surface, such as a 3"×5" index card. The template has a number of parallel slits spaced at pre-designated distances from each other. The template may have slits disposed either vertically or horizontally. Preferably a template with horizontal slits is used in combination with a template having vertical slits to form a grid with horizontal and vertical rules for blocking letters, i.e., for creating blocks, which ensure uniform size and spacing of letters drawn on the index card. The slits guide a writing instrument as a user draws straight lines on the surface of the card, one card at a time.

The templates can be used with an optional frame that is designed to hold several cards under the topmost card that is being marked. The frame may be box-shaped, being adapted for fitting over or receiving a stack of index cards, and the template may be adapted for forming a tight fit in the open top of the frame in order to prevent movement or shifting of the template while drawing lines on the topmost index card.

The functionality of the template for ruling index cards can be expanded to form customized templates for individual users for particular purposes, e.g., for preparing sweepstakes entries. For such use, the templates are used to prepare a grid on a 3×5 sheet of paper or the like having an adhesive strip, and the individual user enters sweepstakes entries (name and address, phone number, date of entry, etc.) onto the grid. A transparency, which may have a grid of knockout blocks formed by perforations, score lines, or the like can be placed over the sheet having the sweepstakes entries and adhered thereto. The knockout blocks overlying the printed matter may then be removed manually or by a punch. Alternatively, the sheet may be attached to a conventional transparency, and blocks of a standard size may be removed by a computer-controlled punch or cutting tool. The transparency with the blocks removed forms a template for neatly entering information for a plurality of sweepstakes entries.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
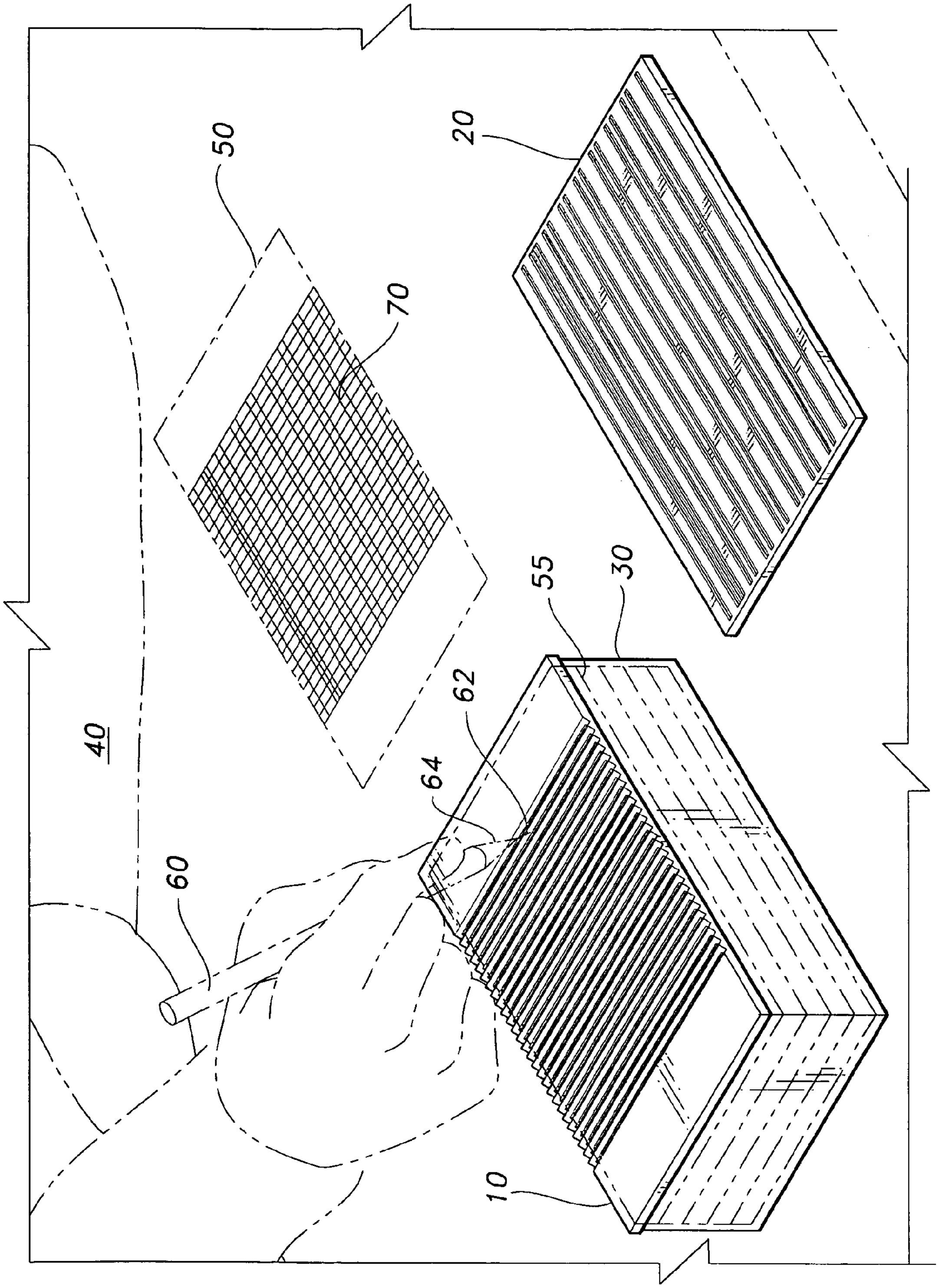
FIG. 1 is an environmental, perspective view of a template for ruling index cards according to the present invention.

The present invention is a template for ruling index cards. Preferably two templates, shown generally as 10 and 20 in FIG. 1, are used in combination for drawing a grid 70 of vertical and horizontal guide lines that are used for blocking letters on the conventional 3"×5" index cards. The grid 70 enables a user to draw uniformly sized and spaced letters in the grid blocks in order to produce a neatly printed index card 50, postcard, or the like.

Template 10 is rectangular, and has a series of parallel slits defined normal to the longer sides of the template 10 and extending across the face of the template 10. The slits are dimensioned so that the point of a pencil can be inserted to lightly draw a plurality of parallel, vertically oriented equally spaced guidelines on the index card. Template 20 is also rectangular, and has a series of parallel slits defined parallel to the longer sides of the template 20 and extending across the face of the template 20. The slits are dimensioned so that the point of a pencil can be inserted to lightly draw a plurality of parallel, horizontally-oriented, equally spaced guidelines on the index card. The user can then draw letters in the blocks defined by the grid 70 and erase the guide lines to produce a neatly printed index card.

Figure 2A:
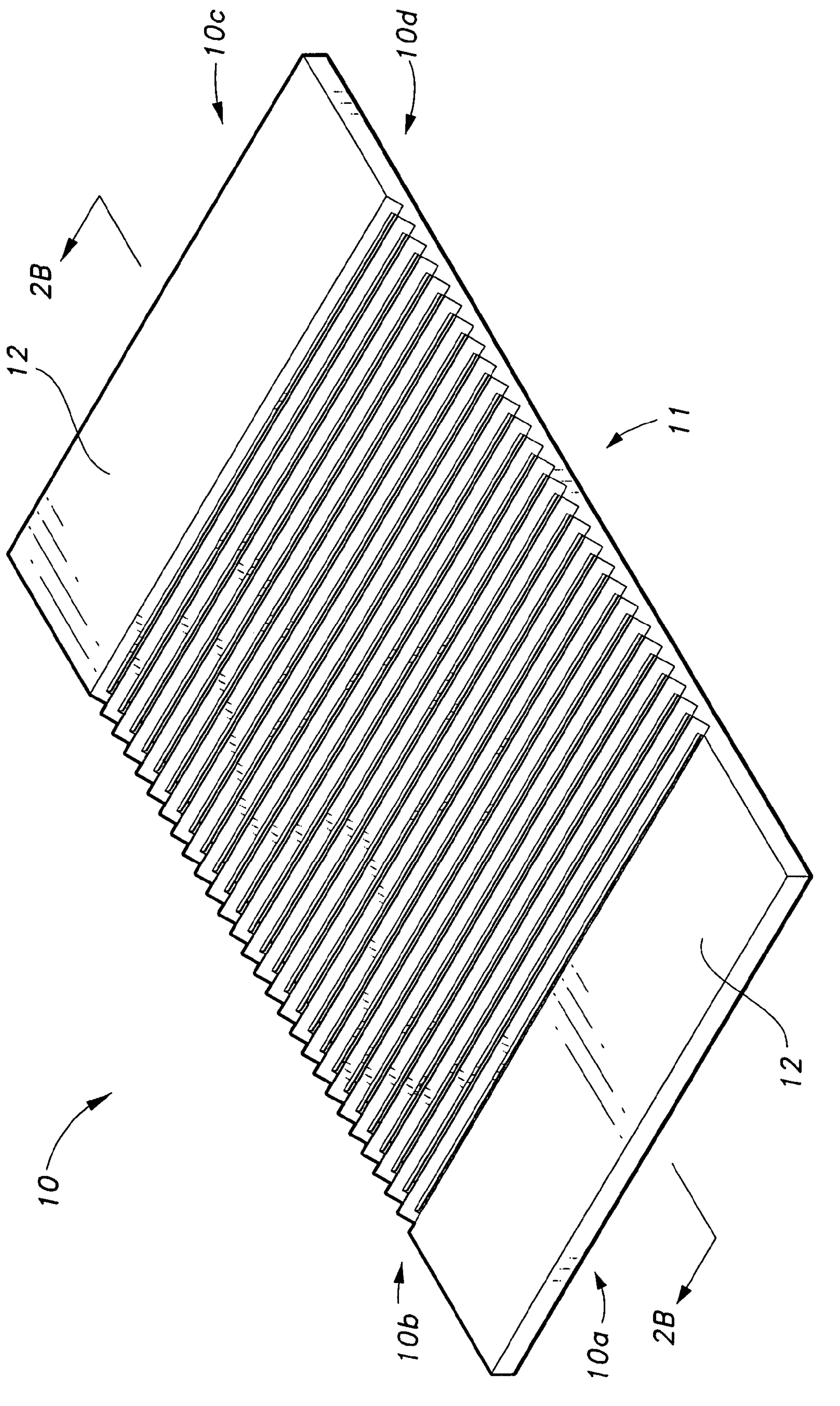
FIG. 2A is a perspective view of a template of the present invention for drawing vertical guidelines on an index card.
Figure 2B:
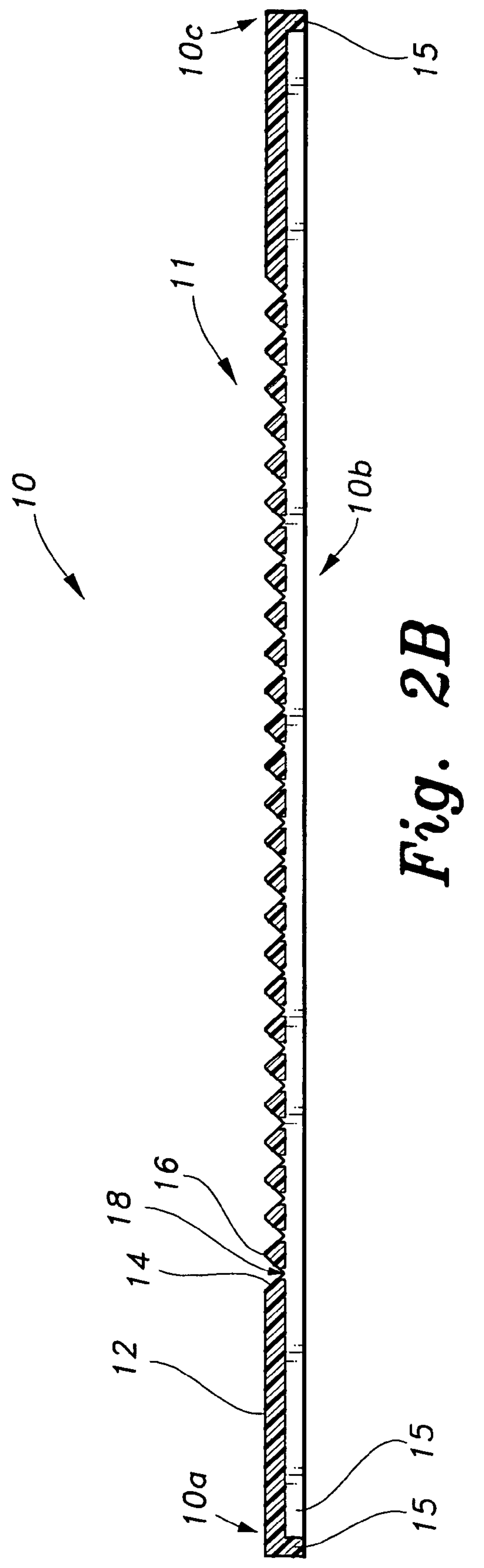
FIG. 2B is a sectional view along lines 2B-2B of FIG. 2A.

Referring to FIG. 2A, template 10 is a relatively thin, flat, rectangular plate having opposing short sides 10*a* and 10*c*, each being slightly greater than 3" long, and opposing long sides 10*b* and 10*d*, each being slightly greater than 5" long. Measuring ⅞" inward from each the short sides 10*a* and 10*c* are non-slitted portions 12. The remaining 3¼" center portion 11 of template 10 is slitted. As shown in FIG. 2B, the non-slitted portions 12 have a beveled edge 14 adjoining slitted portion 11.

The slitted portion 11 is formed with alternating ridged slats 16 and vertical slits 18. In a preferred embodiment, there are a total of twenty-seven vertical slits 18 and twenty-six vertical ridged slats 16. The slits 18 and slats 16 are parallel to each other and to the short sides 10*a* and 10*c* of the template 10. Each ridged slat 16 is about ⅛" apart from the next ridged slat 16 from peak to peak, and consequently each slit 18 is ⅛" away from the next adjoining slit 18. Preferably the height of each ridged slat 16 from its highest point to its lowest point is about 1/16". However, the thickness of the template 10 is not critical to the invention.

The distance between each ridged slat 16 permits the tapered end 64 of a writing instrument 60 to glide along the walls of each ridged slat 16. Vertical slit 18 is wide enough to permit the passage of a tip 62 of the writing instrument 60. Writing instrument 60 is preferably a Papermate Sharpwriter® Mechanical Pencil #2 (Sharpwriter is a trademark of The Gillette Company of Boston, Mass.) or the like, which is suited for use with templates 10, 20, and templates 100 and 200 discussed below. Other writing instruments, however, may also be used, such as pens, conventional pencils, and fine point markers. Each line marked through slit 18 is ⅛" distance apart from the next vertical line mark.

Figure 2C:
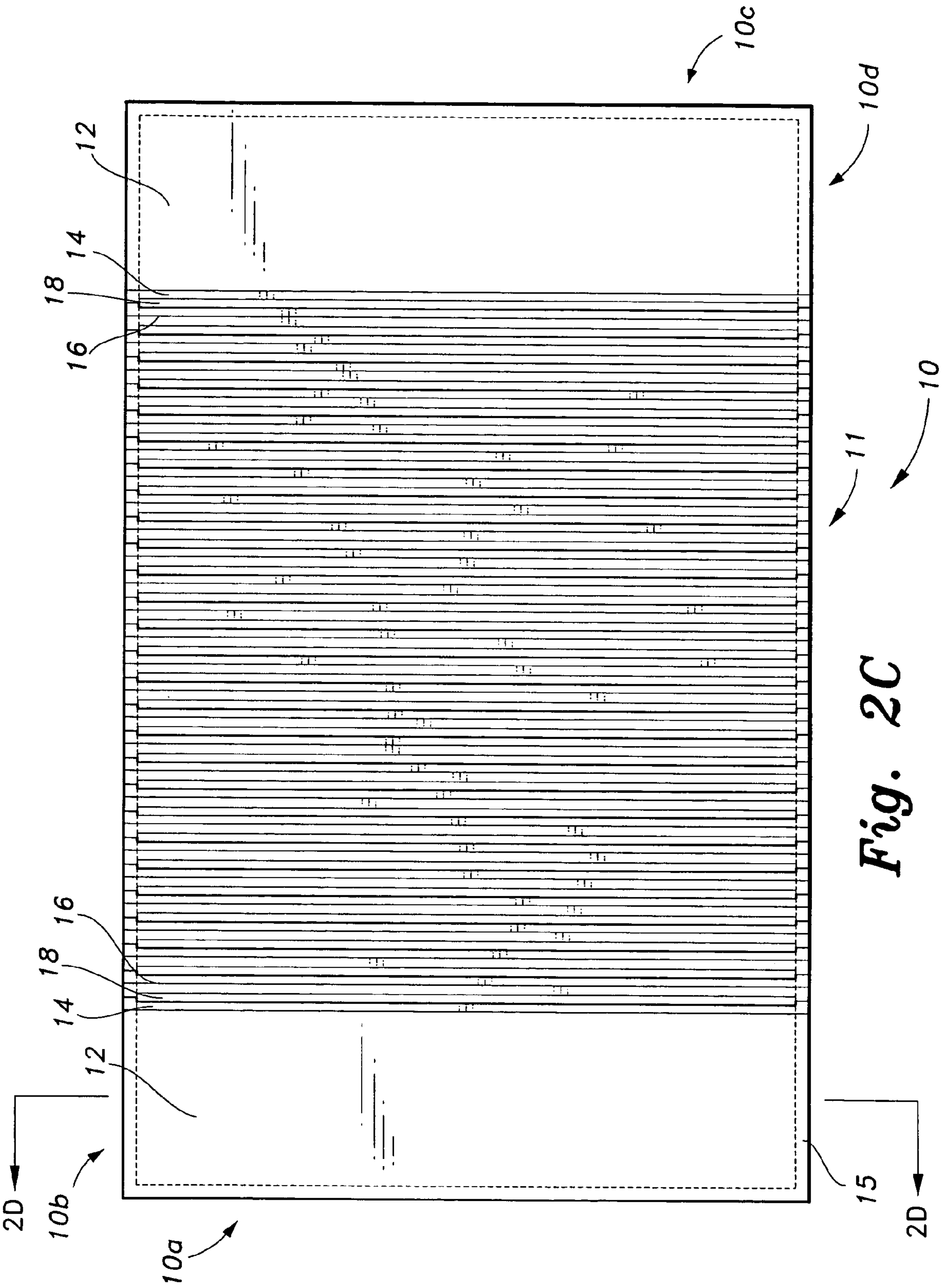
FIG. 2C is a top plan view of the template of FIG. 2A.
Figure 2D:
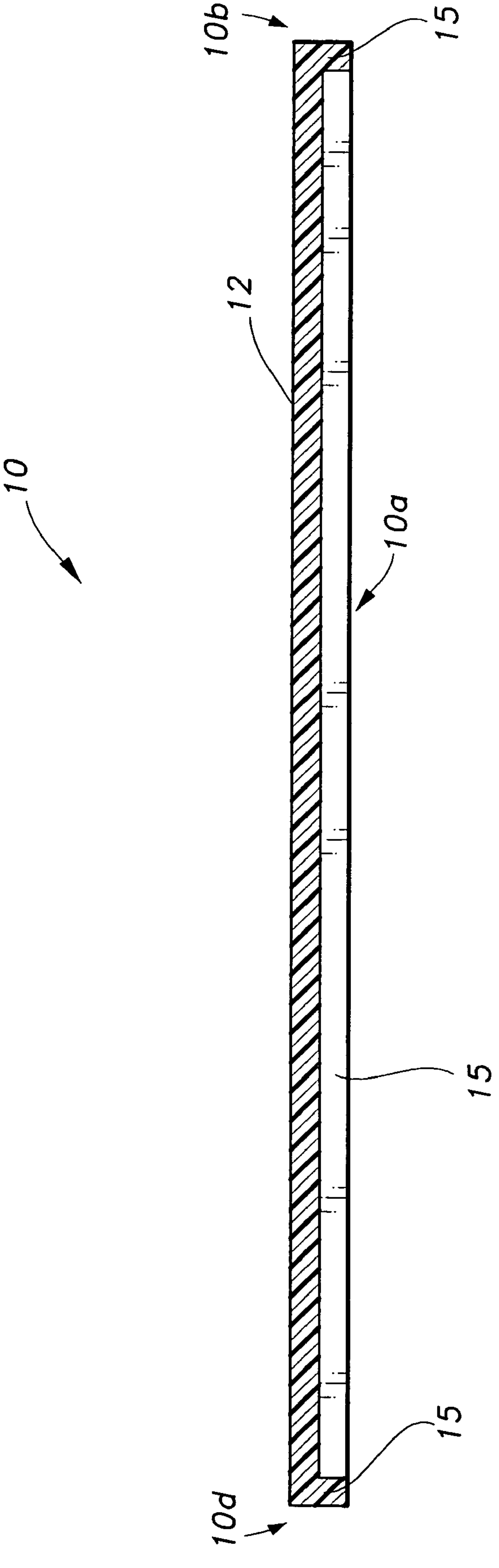
FIG. 2D is a sectional view along lines 2D-2D of FIG. 2C.

Referring now to FIGS. 1, 2C and 2D, template 10 has a lip 15 depending from and extending around the periphery of the plate. In one embodiment, shown in FIGS. 2C and 2D, when template 10 placed over a deck of 3×5 index cards 55, the lip 15 holds the cards 55 in place and prevents the template 10 or the cards 55 from sliding around as a user 40 marks lines on the top-most card, as the inner dimension defined by lip 15 measures about 3"×5". In another embodiment, shown in FIG. 1, the outer dimension of the lip 15 measures about 3"×5", so that when template 10 is placed on frame 30, the lip 15 snaps into the 3"×5" opening defined by frame 30 with a portion of the template 10 overhanging the top edges of frame 30 in order to prevent the template 10 from sliding off the frame 30.

Figure 2E:
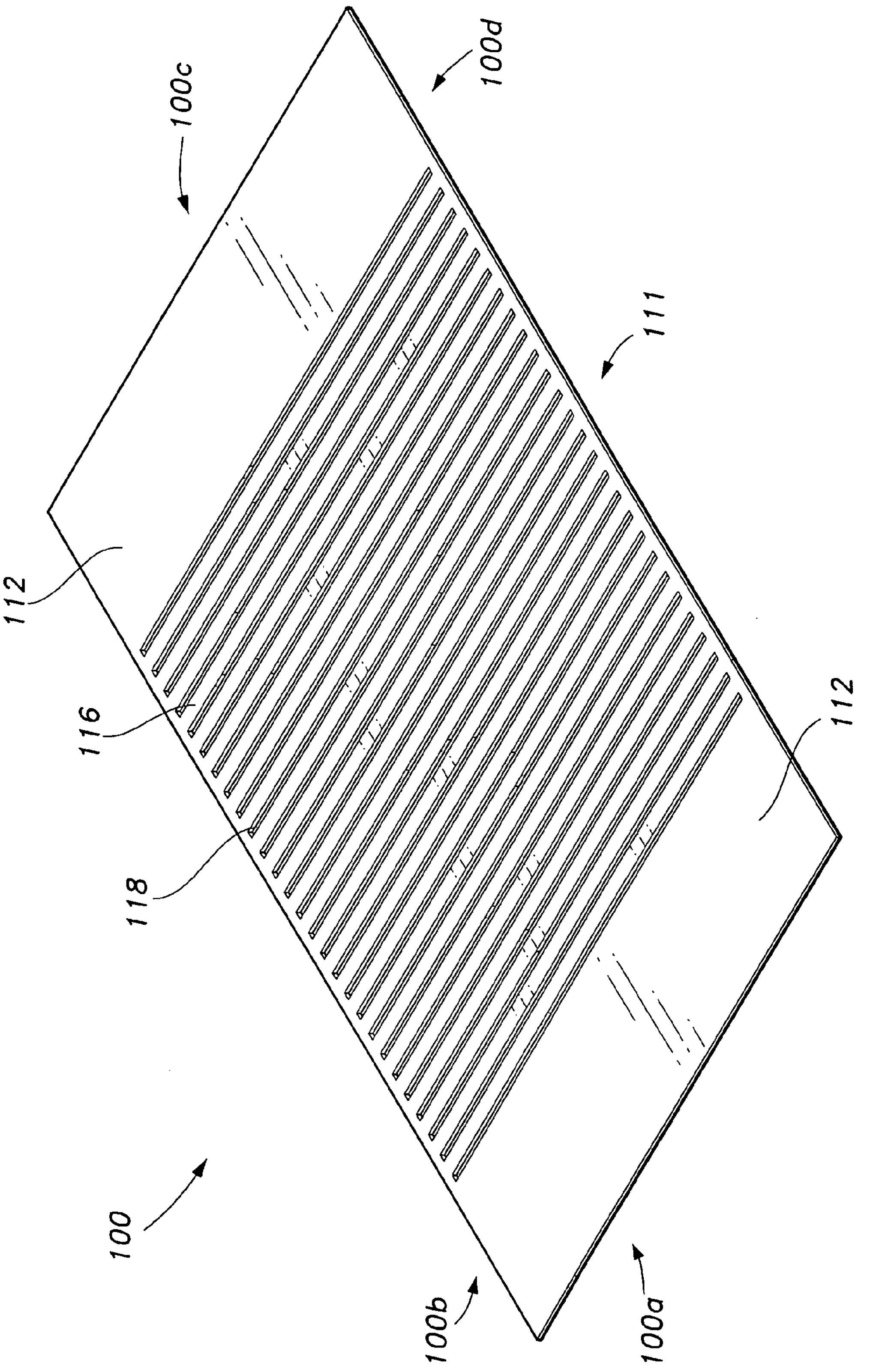
FIG. 2E is a perspective view of an alternative embodiment of a template of the present invention for drawing vertical guidelines on an index card.

Flat, planar template 100, shown in FIG. 2E, is an alternative embodiment to template 10. Template 100 is rectangular, having short sides 100*a* and 100*c*, each being 3" long, and long sides 100*b* and 100*d*, each being 5" long.

Template 100 has two non-slitted portions 112, twenty-six vertical slats 116, each being about ⅛" wide, and twenty-seven vertical slits 118. Slats 116 and slits 118 are parallel to each other and to the short sides 100*a* and 100*c* of the template 100. The series of slats 116 and slits 118 together form a slitted region 111 that occupies about 3¼" of the center portion of template 100. The two non-slitted portions 112 flank slitted region 111 on opposing sides. Each non-slitted portion 112 is ⅞" wide as measured inwards from the short sides 100*a* and 100*c*. Template 100, like template 10, allows the user to mark vertical lines on a card 50 that are ⅛" apart from the next line. The template 100 can be used with or without frame 30. Template 100 differs from template 10 in that template 100 does not have lip 15 depending from its periphery, and the slats 116 are not ridged.

Figure 3C:
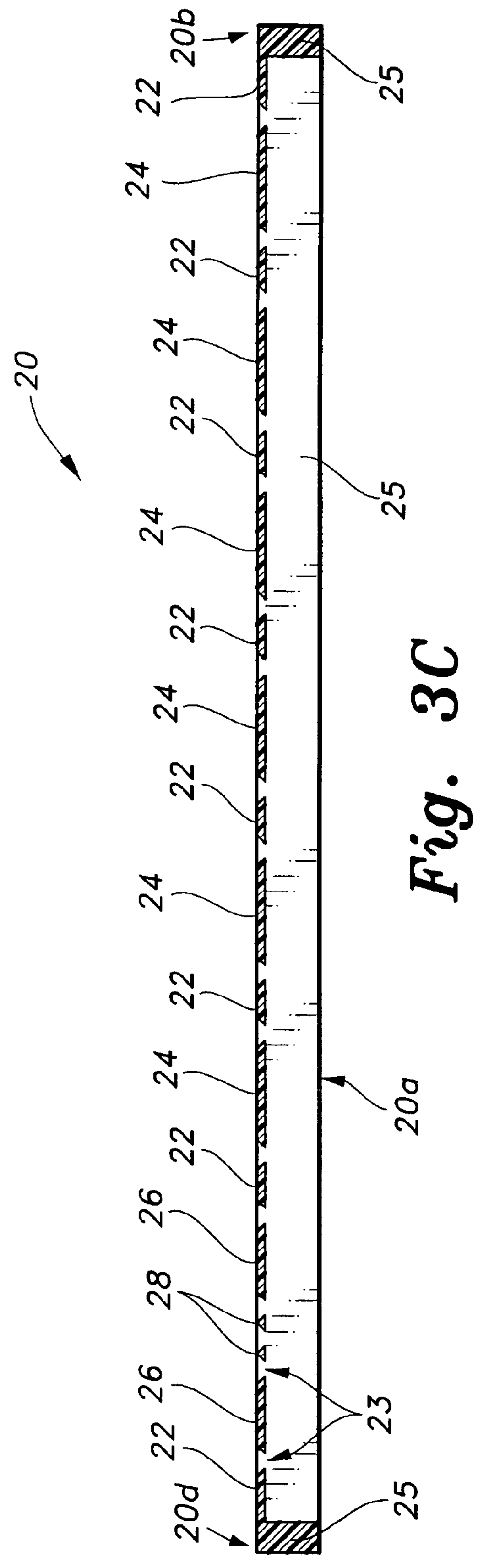
FIG. 3C is sectional view along the lines 3C-3C of FIG. 3B.
Figure 3A:
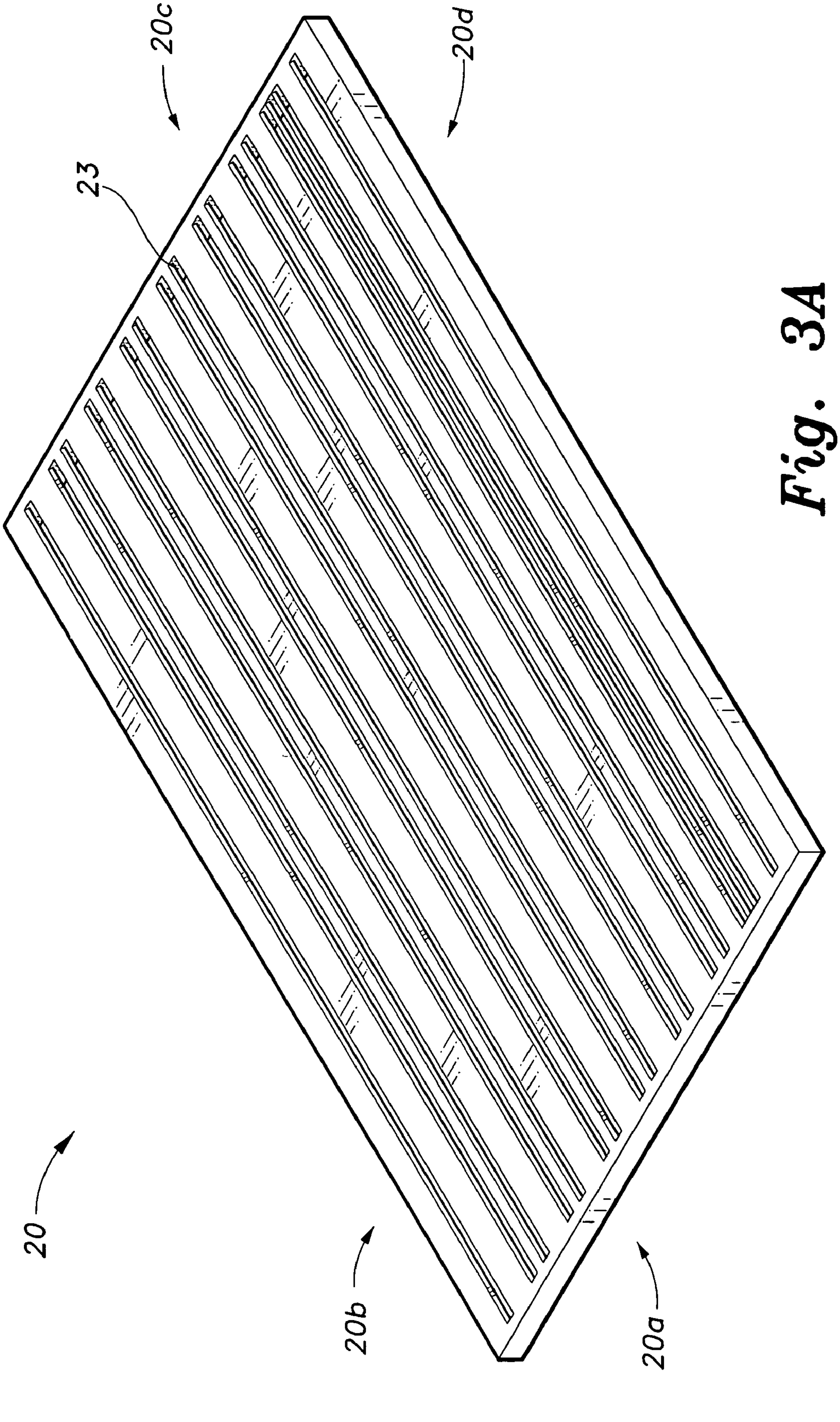
FIG. 3A is a perspective view of a template of the present invention for drawing horizontal guidelines on an index card.
Figure 3B:
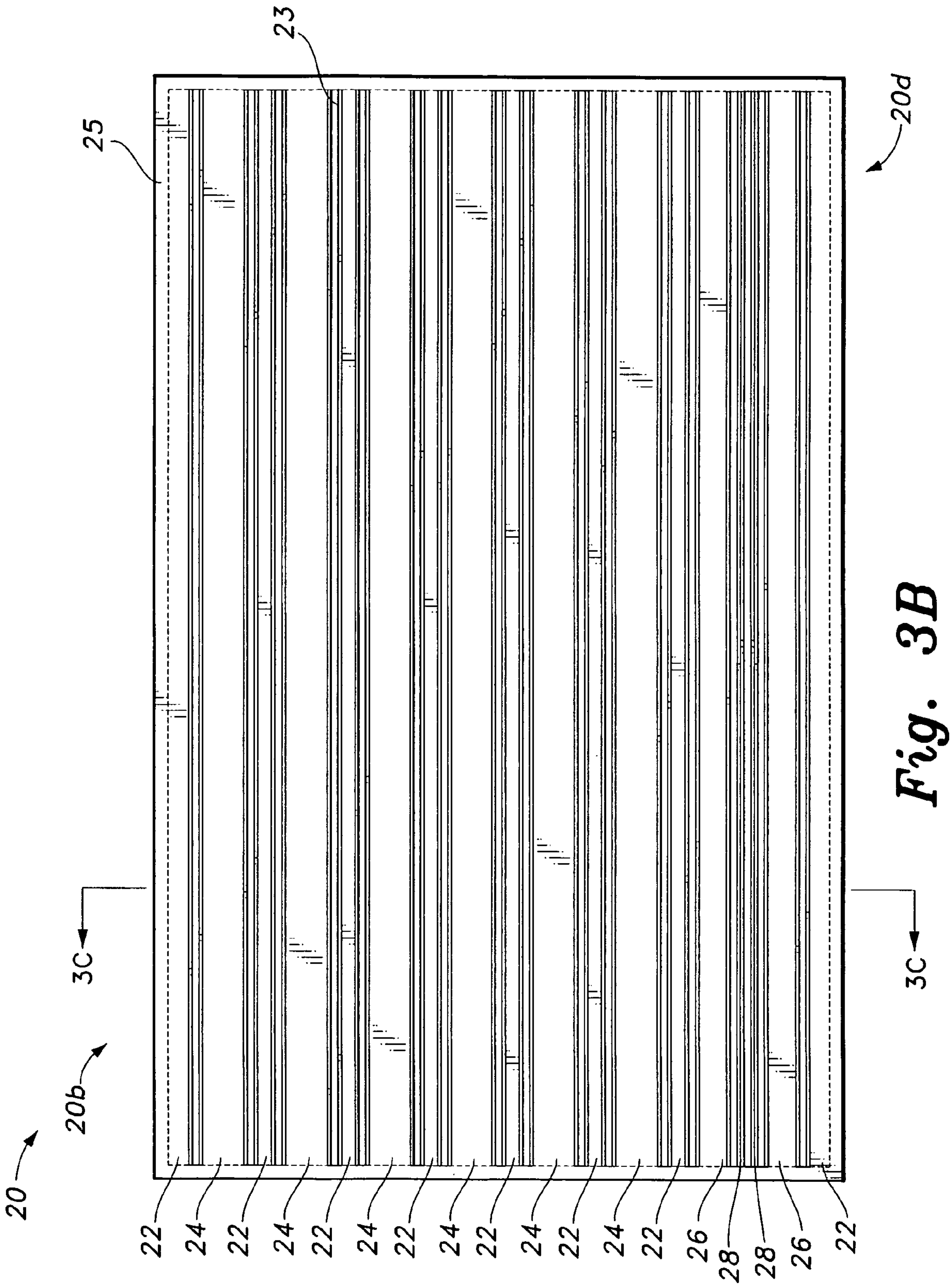
FIG. 3B is a top plan view of the template of FIG. 3A.

The second type of template for marking guidelines is template 20, shown in FIGS. 3A and 3B. Template 20 is a flat, relatively thin rectangular plate having opposing short sides 20*a* and 20*c*, each being slightly greater than 3" long, and opposing long sides 20*b* and 20*d*, each being slightly greater than 5" long. Template 20 has seventeen slits 23 extending parallel to the long sides 20*b* and 20*d*, and is therefore adapted for drawing horizontal guidelines on a 3"×5" index card. The slits 23 may have beveled edges.

A lip 25 depends from and extends around the periphery of template 20, as shown in FIGS. 3B and 3C. Lip 25 serves the same function as lip 15 of template 10, i.e., lip 25 holds the template 20 stationary above either the cards 55 or frame 30 as the user 40 marks horizontal guidelines on the card's 50 surface.

The template 20 has a number of slats 22, 24, 26, 28 having widths ranging between 1/16" and ¼". Slat 22 is ⅛" wide; slat 24 is ¼" wide; slat 26 is 3/16" wide; slat 28 is 1/16" wide. A slit 23 is defined between each slat 22, 24, 26, 28. Starting from long side 20*d* of template 20, the pattern of slats 22, 24, 26, 28 and slits 23 is disposed on the template 20 in the following arrangement: slat 22 followed by slit 23, slat 26 followed by slit 23, slat 28 followed by slit 23, slat 28 followed by slit 23, slat 26 followed by slit 23, slat 22 followed by slit 23, slat 24 followed by slit 23. The remaining slats continue to alternate between the ⅛" slat 22 width and the ¼" slat 24 width until it reaches the opposite 5" long side 20*b*.

Figure 3D:
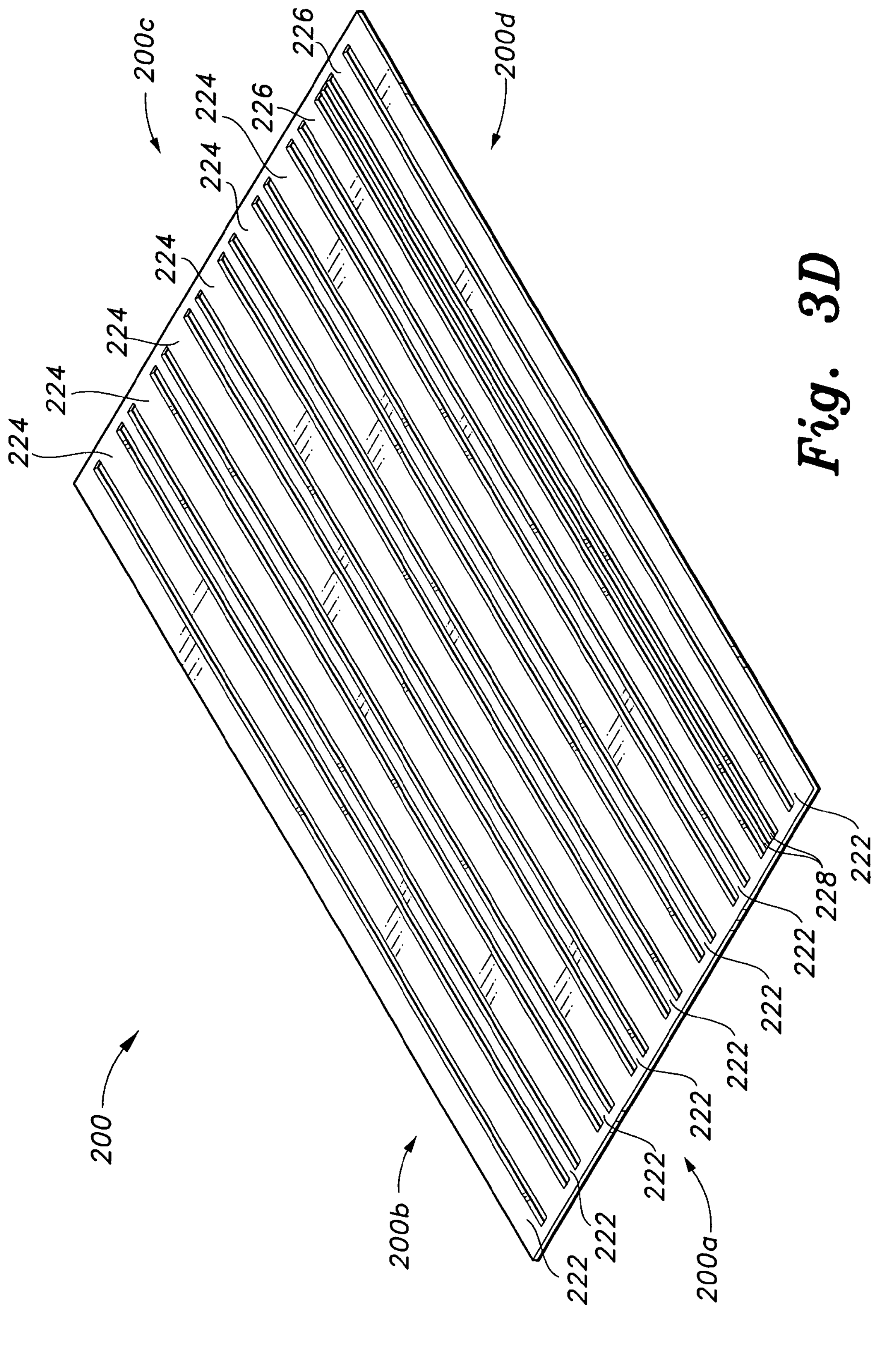
FIG. 3D is a perspective view of an alternative embodiment of a template of the present invention for drawing horizontal guidelines on an index card.

Flat, planar template 200, shown in FIG. 3D, is an alternative embodiment to template 20. Template 200 is similar to template 20 in that slats 222 and 224 alternate between ⅛" and ¼" apart from each other, except for slats 226 and 228 that are 3/16" and 1/16" apart from each other, respectively. Slats 222 are ⅛" wide, slats 224 are ¼" wide, slats 226 are 3/16" wide and slats 228 are 1/16" wide. Between each horizontal slat 222, 224, 226, 228 is a horizontal slit 223 that is wide enough for the tip 62 of a writing instrument 60 to mark the surface of a card 50. Template 200 differs from template 20 in that template 200 lacks lip 25.

Figure 4:
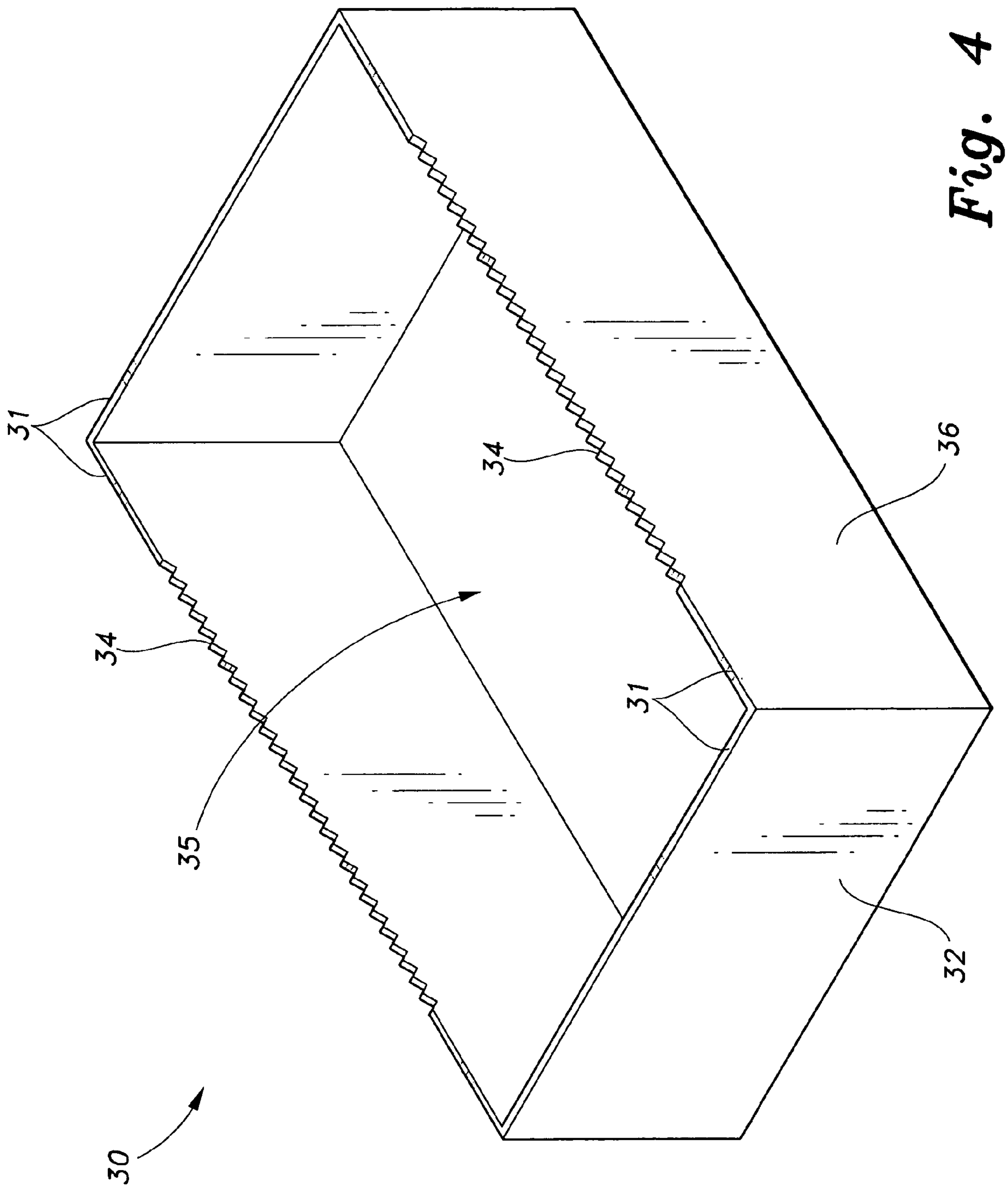
FIG. 4 is a perspective view of a frame used with the template of the present invention.

Referring now to FIG. 4, box-shaped frame 30 is shown having four walls defining a rectangular shape, without a top wall or a bottom wall. End walls 32 are slightly greater than 3" in length and side walls 36 are slightly greater than 5" in length, so that the interior dimension defined by frame 30 is about 3" by 5", and adapted for receiving a deck 55 of 3"×5" index cards. The height of the frame's end walls 32 and sidewalls 36 is about ⅝" high.

The top edge 31 of the frame 30 may have notches 34 on its 5" walls 36. Notches 34 correspond to the ridges 16 and vertical slits 18 disposed on template 10. Lips 15 and 25 permit the templates 10 and 20, respectively, to fit over the exterior perimeter of frame 30 to ensure that the templates 10, 20 do not slide or move as the user 40 marks the surface of cards 55.

The frame 30 is used to contain and surround the writing surface, such as 3×5 index cards 55, and serve as a place for the templates 10, 20 to rest as the user 40 marks lines on the writing surface. The writing surface, as mentioned above, is preferably one 3×5 index card 50, a deck of 3×5 index cards 55 or other writing surfaces being 3" long and 5" wide such a post-its, photographs, etc. The templates 10, 100, 20 and 200 may, however, also be used for marking lines on surfaces that are larger or smaller than 3" by 5". As previously mentioned, frame 30 is an optional feature of the present invention that may be used with templates 10,100, 20 and 200.

In use, with the frame 30, the user 40 sets a deck of 3×5 cards 55 in frame 30 and places template 10 above the cards 55 and frame 30. The user 40 slides the writing instrument 60 along each ridged slat 16. The tip 62 of the writing instrument 60 marks vertical guidelines on the surface of the top most card as it passes through each vertical slit 18. The user 40 then removes template 10 from frame 30 and replaces it with template 20. The user 40 then slides the writing instrument 60 along each slat 22, 24, 26, 28. The tip 62 of the writing instrument 60 now marks horizontal lines on the surface on the same topmost card as it passes through each horizontal slit 23. As shown on exemplary card 50, the end result of marking vertical and horizontal lines on the same index card 50 is the formation of a grid 70. The grid 70 provides defined blocks or spaces for the user to write information in neat rows and columns, one letter or number at a time. Once the grid 70 is formed on the card 50, the card 50 is either removed entirely from the deck of cards 55 or placed under the deck of cards 55 so a new index card may be exposed beneath the template. The grid 70 may be drawn very lightly with the pencil, so that the grid 70 may be erased after the letters have been drawn, if desired.

Optionally, the user 40 can just use either template 10 or 20 alone without the other, for use without frame 30. The steps mentioned above may be done in reverse, with template 20 being used first to mark the card's surface and template 10 being used last. Templates 100 and 200 are designed for use with or without frame 30.

The templates 10, 100, 20, 200 are made from steel, plastic or rubber. Preferably the templates 10, 100, 20, 200 are made from stainless steel. Alternatively, templates 10, 100, 20, 200 may be made from plastic. The plastic should be rigid or semi-rigid, having slits 18, 118, 23, 223 cut into the templates 10, 100, 20, 200, respectively, or the templates could be injection molded with the slits defined by the mold. The plastic material used could be either opaque or transparent.

Figure 5:
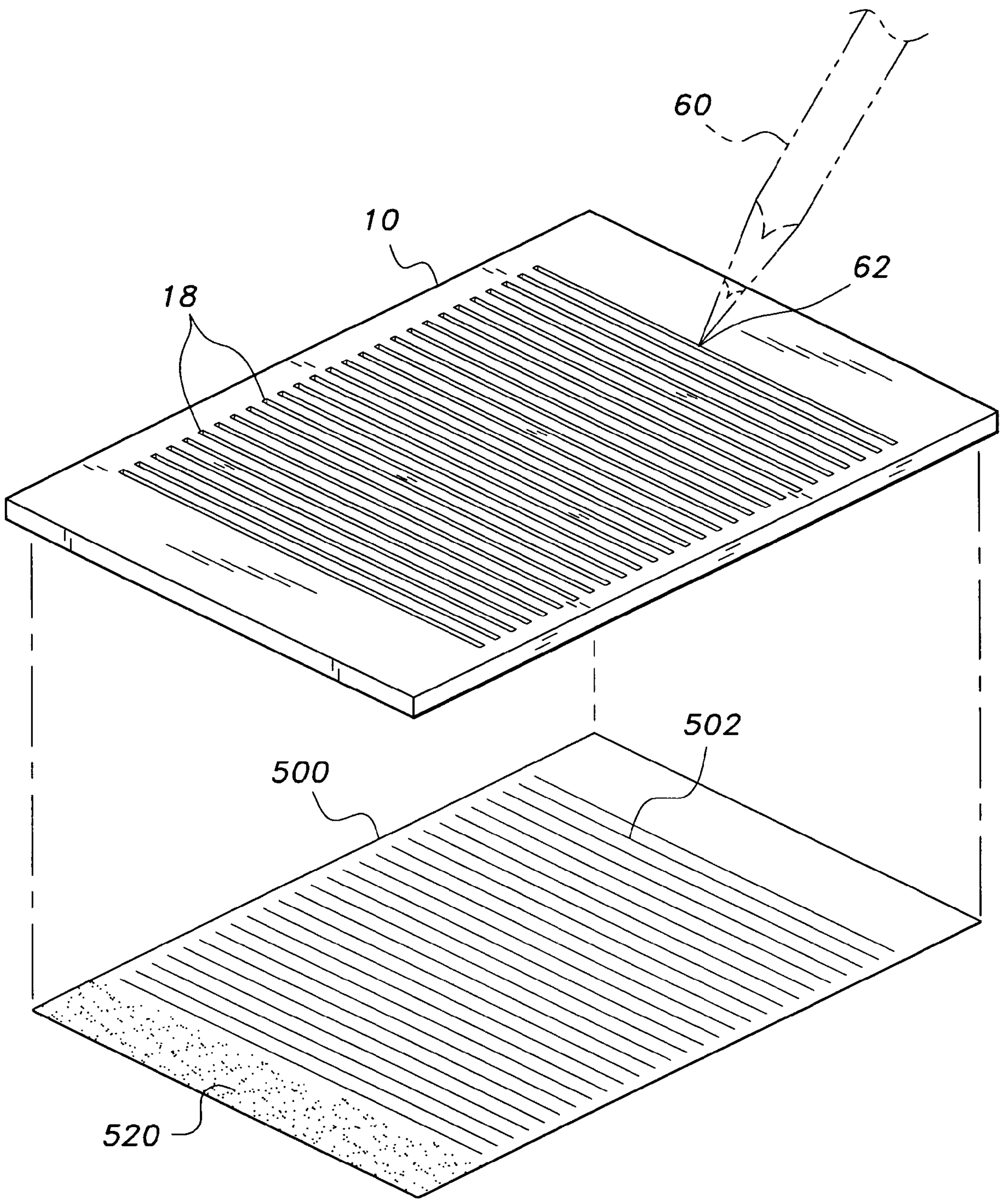
FIG. 5 is a perspective view showing the first step in a method of forming a customized template for sweepstakes entries according to the present invention.

The functionality of the template for ruling index cards can be expanded to form customized templates for individual users for particular purposes, e.g., for preparing sweepstakes entries. FIG. 5 is a perspective view showing the first step in a method of forming a customized template for sweepstakes entries. The template 10 is placed over a 3"×5" sheet of paper 500 or other suitable substrate that can be marked with a pencil or drawing pen, which preferably has a strip of adhesive 520 along at least one side of the sheet 500. Template 10 is used to form a plurality of grid lines 502 normal to the long side of sheet 500, as described above.

Figure 6:
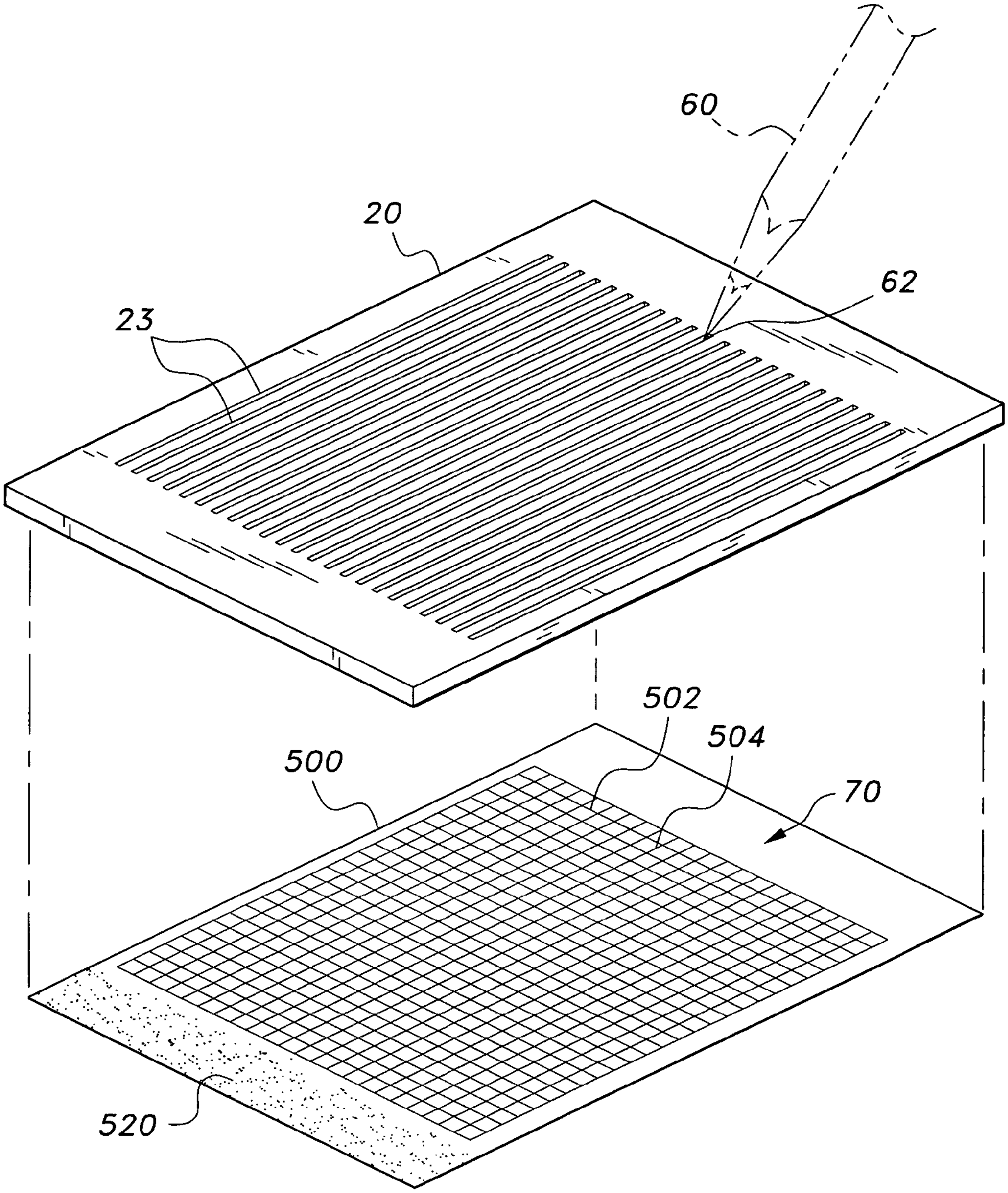
FIG. 6 is a perspective view showing the second step in a method of forming a customized template for sweepstakes entries according to the present invention.
Figure 7:
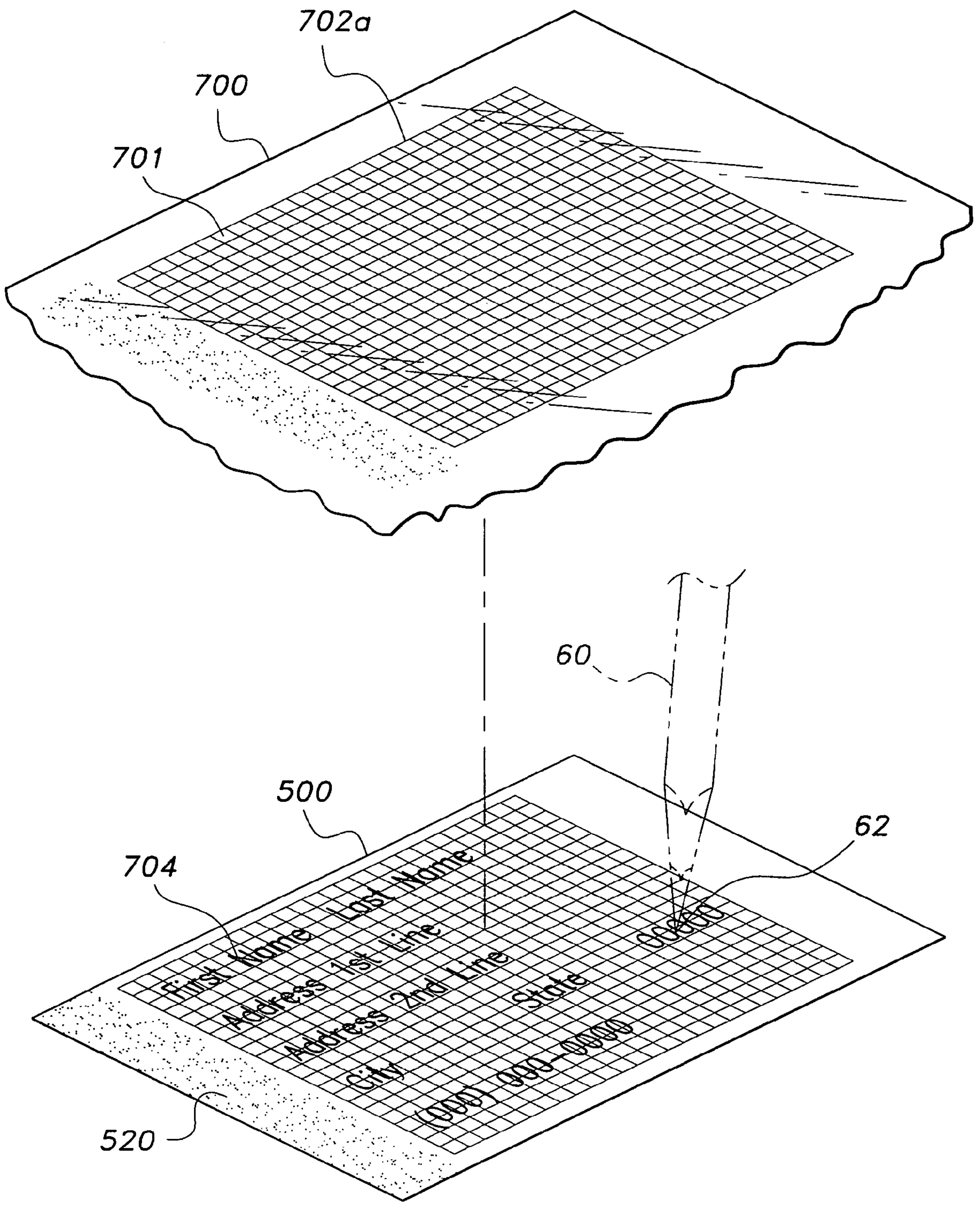
FIG. 7 is a perspective view showing a third step in a method of forming a customized template for sweepstakes entries according to the present invention.

FIG. 6 shows the second step in a method of forming a customized template for sweepstakes entries. In the second step, template 20 is placed over the sheet 500 and used to form a plurality of grid lines 504 parallel to the long side of sheet 500, thereby forming a rectangular grid, as described above when ruling index cards. As shown in FIG. 7, the individual user then prints his or her sweepstakes entries 704 on the sheet 500. For example, the user may print his or her name, address, phone number, entry date, etc.

Figure 8:
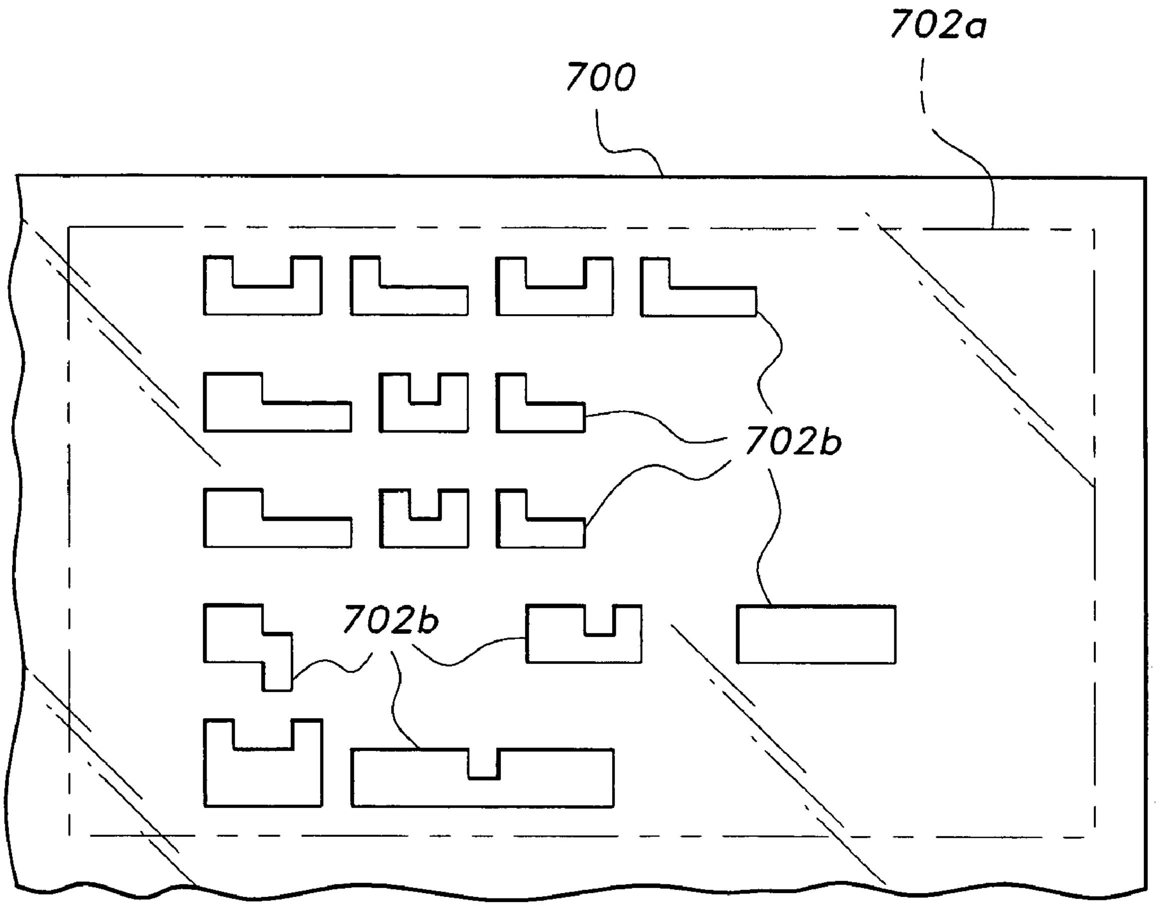
FIG. 8 is a plan view of a completed customized template for sweepstakes entries according to the present invention.

A transparency sheet 700 may then be placed over paper sheet 500 and temporarily adhered thereto, the adhesive strip 520 being formed from a releasable adhesive. The transparency sheet 700 may have a 3"×5" outline 702*a* formed thereon for alignment purposes. The transparency sheet 700 may also have a grid of knockout blocks formed thereon by perforations, score lines, or the like, the grid on the transparency 700 conforming in dimension to the grid formed on paper sheet 500. Knockouts 701 coincident with the user's written information 704 can be punched out to provide a template having openings 702*b* on the 3×5 outline 702*a*, as shown in FIG. 8, thereby forming a template for sweepstakes entries customized to the individual user that can be repetitively used to quickly prepare multiple sweepstakes entries.

Instead of a grid of knockout blocks 701 pre-formed in the transparency sheet 700, the 3"×5" sheet 500 having the entries 704 printed thereon may be scanned and aligned with a computer template of a 3"×5" card having a grid of corresponding dimensions, so that knockout blocks may be designated in reverse video on a computer monitor over the scanned printed entries. A punch or cutting tool operating under computer control may then be used to form cutouts 702*b* corresponding to the blocks marked in reverse video on the monitor to form the template for sweepstakes entries in transparency 700.

Figure 9:
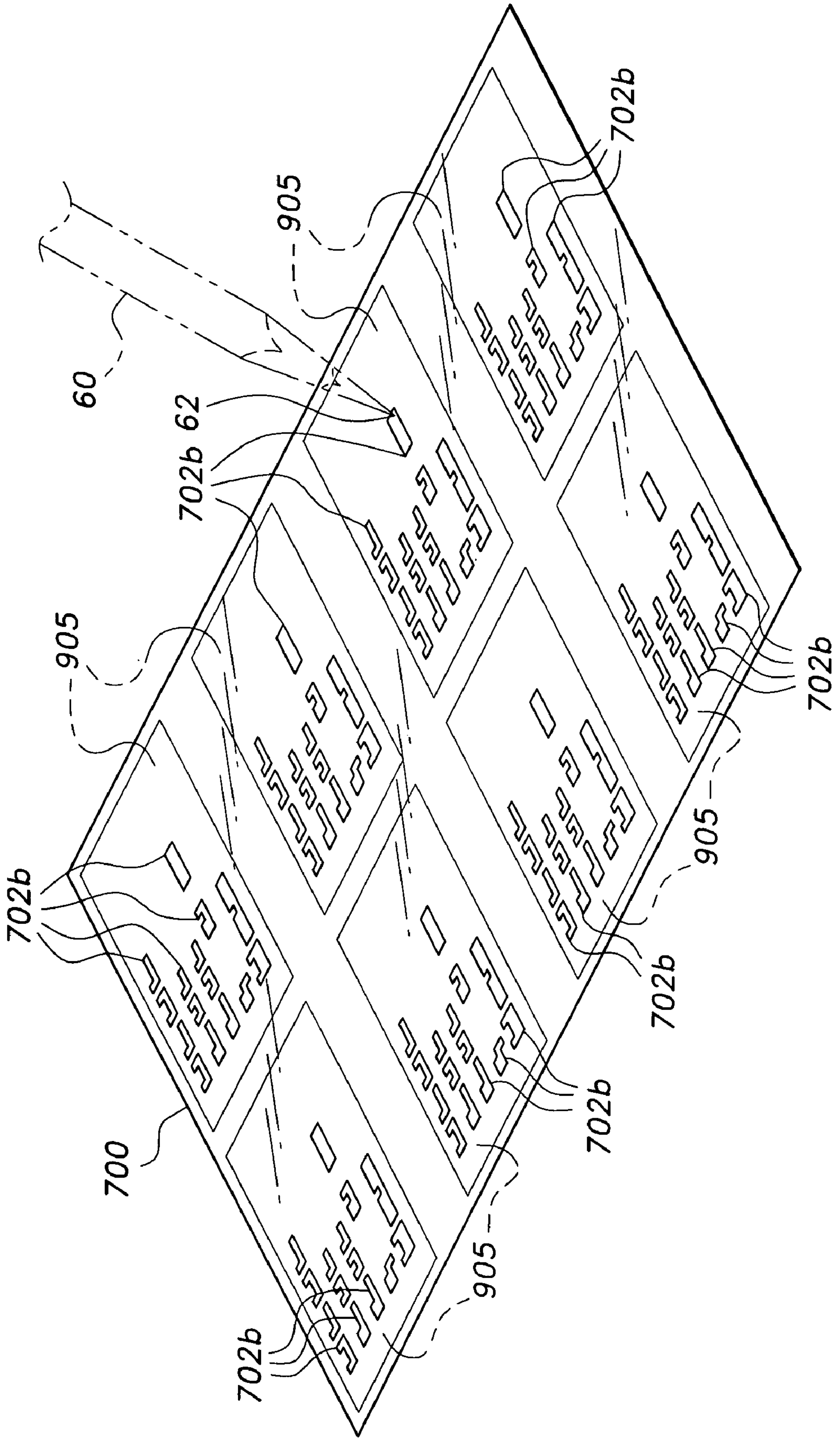
FIG. 9 is an environmental perspective view of a transparency sheet having a plurality of customized templates for sweepstakes entries according to the present invention formed therein in use for making sweepstakes entries on a plurality of index cards.

As shown in FIG. 9, transparency 700 may be an 11"×17" sheet having a plurality of 3'×5" outlines 701 formed thereon in appropriately dimensioned rows and columns, so that a plurality of sweepstakes entry templates may be formed on transparency sheet 700. Once the templates are formed, the transparency may be placed over blank sweepstakes entries 905 or 3"×5" index cards, and cutouts 702*b* can then be used as a guide for completing sweepstakes entries. Although described for forming templates for making sweepstakes entries, it will be obvious that the same process may be used to form transparency templates for any desired purpose.

It is to be understood that the present invention is not limited to the embodiments described above, but encompasses any and all embodiments within the scope of the following claims.

I claim:

1. A method of forming a template for sweepstakes entries, comprising the steps of:

placing a first rectangular template over a three-inch by five-inch marking substrate, the first template having opposing short sides and opposing long sides, the first template having a plurality of parallel slits defined therethrough parallel to the short sides, the slits being dimensioned and configured for receiving a marking instrument;

drawing a plurality of vertical grid lines on the substrate with the marking instrument, using the slits in the first template as a guide;

placing a second rectangular template over the marking substrate, the second template having opposing short sides and opposing long sides, the second template having a plurality of parallel slits defined therethrough parallel to the long sides, the slits being dimensioned and configured for receiving a marking instrument;

drawing a plurality of horizontal grid lines on the substrate with the marking instrument, using the slits in the second template as a guide in order to form a rectangular grid on the substrate;

printing a plurality of sweepstakes entries on the substrate with the marking instrument, using the rectangular grid as a guide for uniform sizing and spacing of characters in the entries;

superpositioning a transparency over the substrate; and forming cutouts in the transparency outlining the entries on the substrate;

whereby the transparency forms a template for printing the sweepstakes entries onto a three-inch by five-inch medium.

2. The method of forming a template according to claim 1, wherein said substrate comprises a paper sheet having a strip of releasable adhesive along an edge thereof, said superpositioning step further comprising placing said transparency on top of the paper sheet and temporarily adhering the transparency thereto.

3. The method of forming a template according to claim 1, wherein said transparency has at least one three-inch by five-inch outline marked thereon, said superpositioning step further comprising aligning the outline with said substrate.

4. The method of forming a template according to claim 3, wherein said at least one outline comprises a plurality of outlines, the method further comprising the step of repeating the superpositioning and forming cutouts steps for each of the outlines.

5. The method of forming a template according to claim 1, wherein said transparency has a rectangular grid of knockout boxes formed thereon of substantially identical configuration to the rectangular grid on said substrate, said forming cutouts step comprising the step of removing a selected plurality of the knockout boxes to form the cutout.

6. The method of forming a template according to claim 1, wherein said removing step comprises punching out the selected plurality of knockout boxes with a punch.

7. A method of forming a template for sweepstakes entries, comprising the steps of:

placing a first rectangular template over a three-inch by five-inch marking substrate, the first template having opposing short sides and opposing long sides, the first template having a plurality of parallel slits defined therethrough parallel to the short sides, the slits being dimensioned and configured for receiving a marking instrument;

drawing a plurality of vertical grid lines on the substrate with the marking instrument, using the slits in the first template as a guide;

placing a second rectangular template over the marking substrate, the second template having opposing short sides and opposing long sides, the second template having a plurality of parallel slits defined therethrough parallel to the long sides, the slits being dimensioned and configured for receiving a marking instrument;

drawing a plurality of horizontal grid lines on the substrate with the marking instrument, using the slits in the second template as a guide in order to form a rectangular grid on the substrate;

printing a plurality of sweepstakes entries on the substrate with the marking instrument, using the rectangular grid as a guide for uniform sizing and spacing of characters in the entries;

scanning the substrate with a computer scanner to form a digital image of the substrate on a computer monitor;

superpositioning a computer template of a three-inch by five-inch card over the digital image of the substrate, the computer template having a rectangular grid corresponding to the grid formed on the substrate;

marking blocks of the computer template grid overlying the printing for removal; and forming cutouts in a transparency corresponding to the marked blocks under computer control;

whereby the transparency forms a template for printing the sweepstakes entries onto a three-inch by five-inch medium.

8. The method of forming a template according to claim 7, wherein said transparency has a plurality of three-inch by five-inch outlines defined thereon, said step of forming cutouts being performed for each of the three-inch by five-inch outlines.

9. A template kit for ruling index cards and forming a template for sweepstakes entries, comprising:

a first rectangular plate having opposing short sides and opposing long sides, the plate defining a periphery and having a plurality of parallel slits defined therethrough parallel to the short sides dimensioned and configured for receiving a marking instrument;

a second rectangular plate having opposing short sides and opposing long sides, the plate defining a periphery and having a plurality of parallel slits defined therethrough parallel to the long sides dimensioned and configured for receiving the marking instrument;

a marking substrate; and a transparency;

wherein the first plate and the second plate are adapted for being successively disposed over the index cards so that the marking instrument is drawn through the slits in order to rule the index cards with a grid of horizontal and vertical guide lines; and wherein the first plate and the second plate are adapted for being successively disposed over the marking substrate so that the marking instrument is drawn through the slits in order to rule the substrate with a grid of horizontal and vertical guide lines, the substrate being capable of having sweepstakes entries printed thereon using the grid as a printing guide, the transparency being capable of being overlaid on the substrate and having cutouts formed therein corresponding to the sweepstakes entries in order to form the template for sweepstakes entries.

10. The template kit according to claim 9, wherein said transparency has at least one outline marked thereon corresponding in dimension and configuration to said marking substrate, the transparency further having a rectangular grid of knockout boxes formed within the outline corresponding to the grid ruled on the substrate, whereby a plurality of the knockout boxes may be punched out to form the cutouts.

11. The template kit according to claim 9, wherein said marking substrate comprises a rectangular sheet of paper having a strip of releasable adhesive formed along an edge thereof, whereby said transparency may be releasably secured to said substrate in order to mark the cutouts for removal.

12. The template kit according to claim 9, wherein the first rectangular plate has a lip depending from and extending from the periphery.

13. The template kit according to claim 9, further comprising a frame for holding the index cards, and exposing one card at a time, the frame being dimensioned and configured to successively receive the first rectangular plate and the second rectangular plate.

14. The template kit according to claim 9, wherein said first and second rectangular plates each comprise a plurality of parallel slats defining the slits, each of the slats having a raised ridge for guiding a tip of the marking instrument.

* * * * *